US009245006B2

(12) United States Patent
Scheidl et al.

(10) Patent No.: US 9,245,006 B2
(45) Date of Patent: Jan. 26, 2016

(54) DATA SEARCH USING CONTEXT INFORMATION

(75) Inventors: Stefan Scheidl, Dieburg (DE); Stephan Brand, Wiesloch (DE); Nico Licht, Heidelberg (DE); Klaus Reichenberger, Frankfurt (DE); Archim Heimann, Wiesloch (DE); Steffen Moldaner, Riedstadt (DE)

(73) Assignees: SAP SE, Walldorf (DE); intelligent views gmbh, Darmstadt (DE)

( * ) Notice: Subject to any disclaimer, the term of this patent is extended or adjusted under 35 U.S.C. 154(b) by 160 days.

(21) Appl. No.: 13/248,610

(22) Filed: Sep. 29, 2011

(65) Prior Publication Data
US 2013/0086101 A1  Apr. 4, 2013

(51) Int. Cl.
*G06F 17/30* (2006.01)

(52) U.S. Cl.
CPC .... *G06F 17/30672* (2013.01); *G06F 17/30528* (2013.01)

(58) Field of Classification Search
CPC .................. G06F 17/30864; G06F 17/30528; G06F 17/30672
See application file for complete search history.

(56) References Cited

U.S. PATENT DOCUMENTS

| 6,453,353 | B1 * | 9/2002 | Win et al. ..................... 709/229 |
| 7,337,158 | B2 * | 2/2008 | Fratkina et al. ................. 706/45 |
| 7,519,593 | B2 * | 4/2009 | Abe et al. |
| 7,542,969 | B1 * | 6/2009 | Rappaport et al. |
| 7,801,917 | B2 * | 9/2010 | Gilmour et al. ............... 707/784 |
| 8,234,633 | B2 * | 7/2012 | Schneider et al. ............ 717/135 |
| 2004/0139106 | A1 * | 7/2004 | Bachman et al. .......... 707/104.1 |
| 2006/0212265 | A1 * | 9/2006 | Amitay et al. ................ 702/182 |
| 2007/0164849 | A1 * | 7/2007 | Haeberle et al. ............. 340/7.23 |
| 2007/0174260 | A1 * | 7/2007 | Bachman et al. ................. 707/3 |
| 2007/0174731 | A1 * | 7/2007 | Haeberle et al. ................ 714/46 |
| 2007/0271107 | A1 * | 11/2007 | Fiedler et al. ..................... 705/1 |
| 2008/0103869 | A1 * | 5/2008 | Hutty et al. ...................... 705/9 |
| 2008/0189163 | A1 * | 8/2008 | Rosenberg et al. ............... 705/9 |
| 2008/0263009 | A1 * | 10/2008 | Buettner et al. ................... 707/3 |
| 2009/0063175 | A1 * | 3/2009 | Hibbets et al. .................... 705/1 |
| 2009/0063470 | A1 * | 3/2009 | Peled et al. ....................... 707/5 |
| 2009/0157812 | A1 * | 6/2009 | Bavly et al. ..................... 709/204 |
| 2010/0131283 | A1 * | 5/2010 | Linthicum et al. ................ 705/2 |
| 2010/0246800 | A1 * | 9/2010 | Geppert et al. .......... 379/265.09 |
| 2010/0287014 | A1 * | 11/2010 | Gaulin et al. ..................... 705/7 |
| 2011/0047138 | A1 * | 2/2011 | Dong et al. ..................... 707/706 |
| 2011/0087708 | A1 * | 4/2011 | Teichmann et al. ........... 707/803 |
| 2011/0093512 | A1 * | 4/2011 | Hawkes et al. ............... 707/803 |
| 2011/0184827 | A1 * | 7/2011 | Hubert ......................... 705/26.1 |
| 2012/0078926 | A1 * | 3/2012 | Chu-Carroll et al. ......... 707/755 |
| 2012/0136649 | A1 * | 5/2012 | Freising et al. ................... 704/9 |
| 2012/0246136 | A1 * | 9/2012 | Moss ............................ 707/707 |
| 2012/0265752 | A1 * | 10/2012 | Toebes .......................... 707/722 |
| 2013/0007527 | A1 * | 1/2013 | Petukhov et al. ............... 714/37 |

* cited by examiner

*Primary Examiner* — Leslie Wong
(74) *Attorney, Agent, or Firm* — Schwegman Lundberg & Woessner, P.A.

(57) ABSTRACT

In an embodiment, a method is provided for conducting a search. In this method, a message is received from a client application. A user that initiated the message is identified and context information associated with the user is retrieved. Thereafter, a business object associated with the context information is identified and a domain associated with the business object is identified. Here, the domain includes a number of terms, and one or more of these terms are selected to be included in a query. A search of a data source can then be conducted using this query.

20 Claims, 7 Drawing Sheets

DATA SEARCH USING CONTEXT INFORMATION

FIELD

The present disclosure relates generally to data searches. In an example embodiment, the disclosure relates to performing a data search using context information.

BACKGROUND

Generally, a search engine is a program that is designed to search for information from a variety of sources of data, such as the World Wide Web and File Transfer Protocol (FTP) servers. Many of these conventional search engines are designed to conduct searches based on matching of keywords. For example, a conventional search engine searches documents for keywords, which are specified by a user, and returns a list of documents where the keywords are found. However, conventional search engines often do not take into account the context to which the keywords are specified. For example, a search engine processing a keyword "table" cannot differentiate a furniture "table" from a database "table." As a result, many of these conventional search engines are notoriously inaccurate at searching for keywords that have different meanings in different contexts.

BRIEF DESCRIPTION OF DRAWINGS

The present disclosure is illustrated by way of example and not limitation in the figures of the accompanying drawings, in which like references indicate similar elements and in which.

DETAILED DESCRIPTION

The description that follows includes illustrative systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures and techniques have not been shown in detail.

The embodiments described herein provide techniques for conducting data searches using context information. Generally, context information refers to any information that can be used to characterize the situation of one or more users or computational objects. Examples of context information include a user's identity, a user's business role, and a type of business object. As explained in more detail below, an example embodiment of a system can use such context information in a data search to refine queries submitted to one or more search engines. As also explained-below, when compared to conventional data searches, data searches using the refined queries can be more accurate and relevant.

Figure 1:
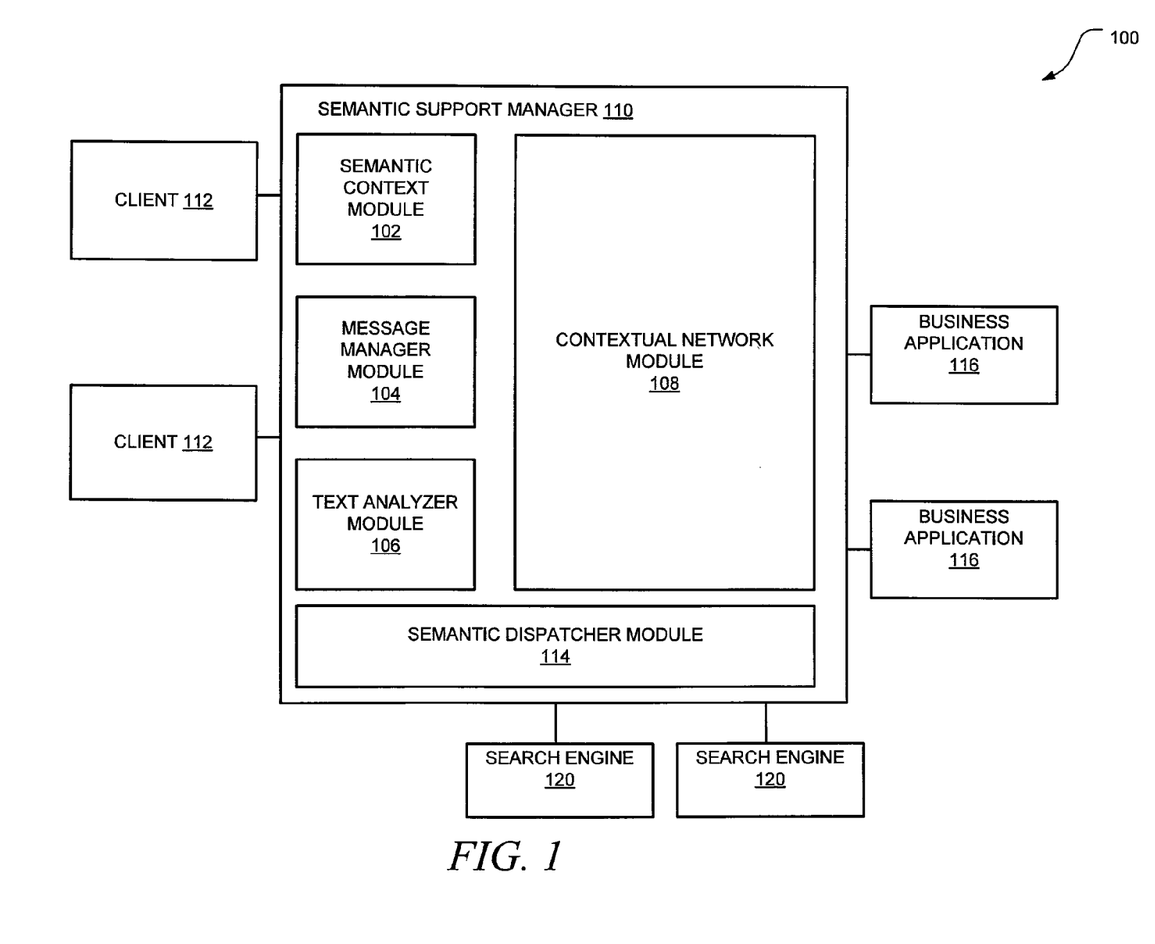
FIG. 1 is a block diagram depicting an architectural overview of a system for conducting a search using context information, in accordance with an example embodiment.

FIG. 1 is a block diagram depicting an architectural overview of a system 100 for conducting a search using context information, in accordance with an example embodiment. The networked system 100 includes a semantic support manager 110 that is in communication with one or more client computing devices 112, business applications 116, and search engines 120. The semantic support manager 110 may be embodied in a computing device in the form of, for example, a personal computer, a server computer, or other computing devices. In various embodiments, the computing device may be used to implement computer programs, logic, applications, methods, processes, or software to conduct a search using context information, as described in more detail below.

The semantic support manager 110 is designed to conduct or facilitate a search of a variety of different information. In an example embodiment, the semantic support manager 100 is designed to search for information related to technical support, which refers to a range of services by which enterprise applications provide assistance to users of technology products. The semantic support manager 110 depicted in FIG. 1 includes a semantic context module 102, a message manager module 104, a text analyzer module 106, a contextual network module 108, and a semantic dispatcher module 114. The message manager module 104 is configured to facilitate communication between components. For example, the message manager module 104 can transmit and receive messages or other data to and from client computing devices 112, the semantic context module 102, the contextual network module 108, the text analyzer module 106, and the semantic dispatcher module 114.

The semantic context module 102 is configured to retrieve context information associated with a user. As used herein, "context information" refers to any information that can be used to characterize the situation of one or more users or computational objects that are considered relevant to the interaction between a user and an application, including the user and the application themselves. Context can include the location, identity, and state of a user or a group of users, such as a user's position within an organization, a user's expertise, a user's competence level, a user's business role, a user's name, a user's business address, and a user's project assignments. Additionally, context can include the location, identity, and state of one or more computational objects, such as a name of a business object and a type of business object. It should be noted that a "business object," as used herein, refers to a representation of a business entity, such as an employee or a sales order, in an enterprise system. That is, a business object is a type of entity inside the business layer in an n-layered architecture of object-oriented computer programs. A business object encompasses both the functions (in the form of methods) and the data (in the form of attributes) of this business entity. The context information may be stored in a variety of systems. For example, the semantic support manager 110 can store the context information. Alternatively, as explained in more detail below, the context information can be stored in a variety of other systems that are in communication with the semantic support manager 110.

With the context information retrieved, the contextual network module 108 and the text analyzer module 106 are configured to generate terms based on the context information for use in a data search. As explained in detail below, the contextual network module 108 basically creates terms used in a search by examining various business functional data associated with the context information. The business applications 116 in communication with the semantic support manager 110 can provide the business functional data to the contextual network module 108. These business functional data can be provided by business applications 116 that are in communication with the semantic support manager 110. As also explained in detail below, the text analyzer is configured to parse, categorize, and analyze data.

Still referring to FIG. 1, with the terms identified, the semantic dispatcher module 114 conducts a search of electronic documents or other information using the terms as a query. In one embodiment, the semantic dispatcher module 114 conducts the search by submitting the results from the text analyzer module 114 to one or more search engines 120 that are in communication with the semantic support manager 110.

Figure 2:
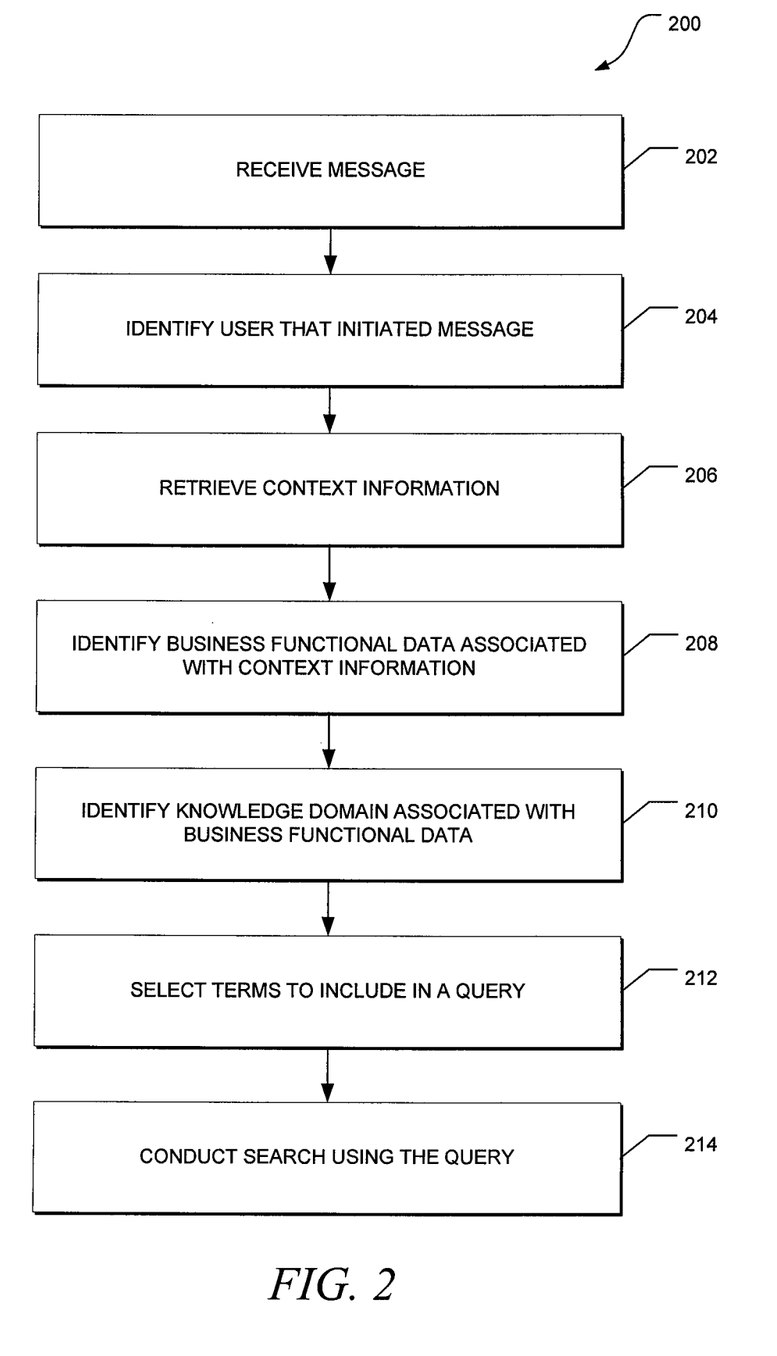
FIG. 2 depicts a flow diagram of a general overview of a method, in accordance with an embodiment, for conducting a data search using context information.

FIG. 2 depicts a flow diagram of a general overview of a method 200, in accordance with an embodiment, for conducting a data search using context information. In an example embodiment, the method 200 may be implemented by the semantic support manager 110 included in the system 100 of FIG. 1. Referring to FIG. 2, the semantic support manager receives a message from, for example, a client application at 202. This message includes one or more terms that, in one embodiment, may relate to requests for technical support. For example, the message may be in the form of a question typed by a user requesting information about a particular business application. In another example, the message may be a request by a user to contact an expert in a certain technical field for assistance in solving his problem.

After the message is retrieved, the semantic support manager identifies the user that initiated the message, at 204, and then retrieves, at 206, context information associated with the identified user. As explained in more detail below, the context information can be retrieved from a variety of different systems that are in communication with the semantic support manager.

The semantic support manager then identifies, at 208, the various business functional data that are associated with the context information. As used herein, "business functional data" refer to business objects, business processes, business data storages, and/or transactions. A business process is a series of steps or actions directed to a business functionality. Business data storage refers to the storage of organized collection of business data. For example, business data storage can refer to a variety of different data structures, such as databases, tables, arrays, and linked lists. A transaction specifies the characteristics and attributes of a business transaction.

With the business functional data identified, the semantic support manager then, at 210, identifies a domain associated with each business functional data. A "domain," as used herein, refers to a common name under which a collection of terms are grouped and organized. Therefore, a domain includes a collection of terms. For example, a particular domain can include the terms "table," "database," and "column." Another example of a domain can include the terms "spreadsheet," "table," "inventory," and "phone number." A user can define the terms to be included in a domain, or the terms can be imported from, for example, a business application, as explained in detail below. Each domain is assigned to or associated with at least one business functional data. For example, a particular domain can be associated with a particular business object. In another example, a particular domain can be associated with a particular business process. A user can define the relationships between the domains and business functional data.

At 212, the semantic support manager thereafter selects one or more terms from the domain to include in a query. As explained in more detail below, the semantic support manager can select these business terms based on a variety of different criteria to include in a query, which is an inquiry about information or items. With the query constructed, the semantic support manager, at 214, conducts a search of one or more data sources using the query.

Figure 3:
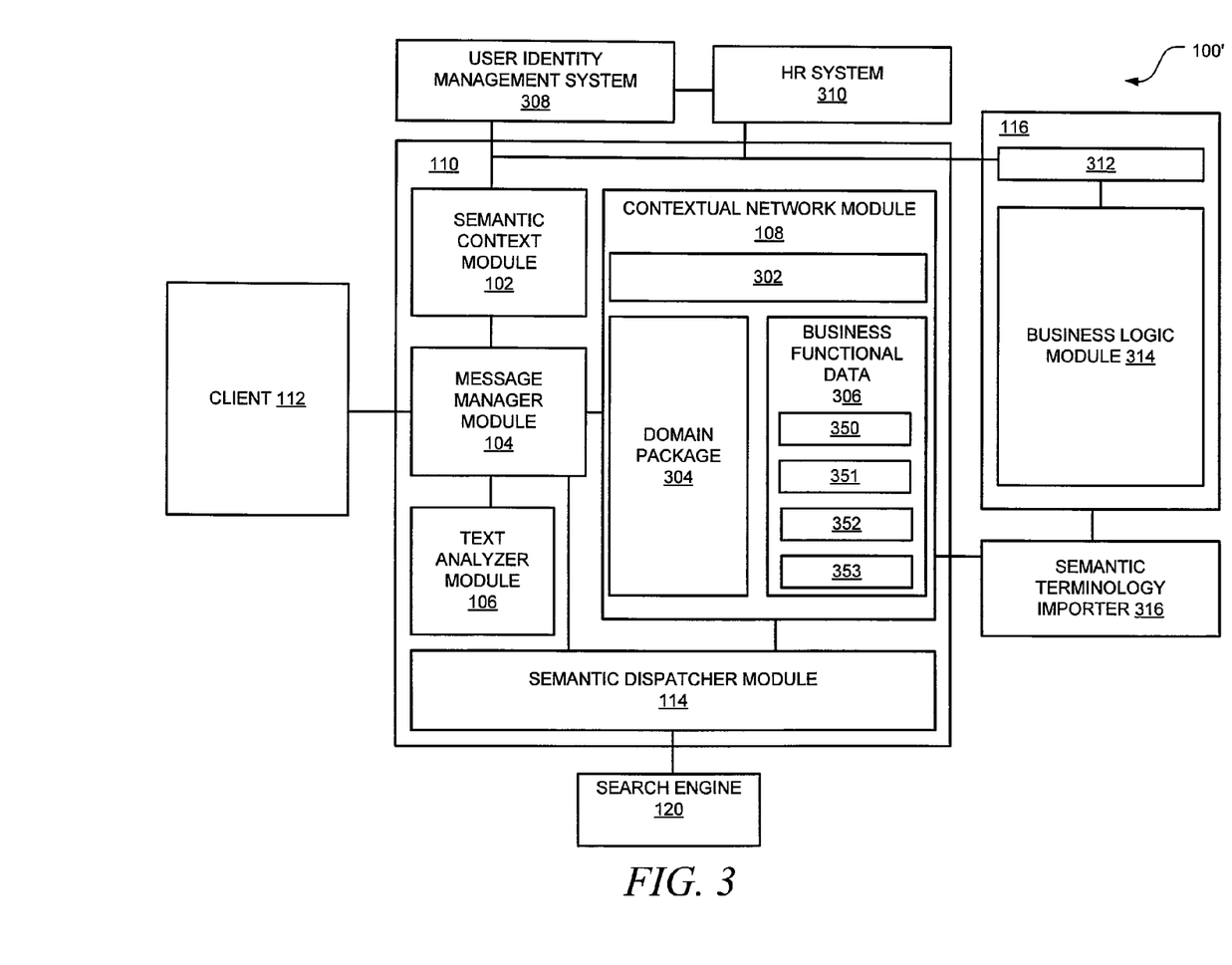
FIG. 3 is a block diagram depicting an architectural overview of a detailed system for conducting a search using context information, in accordance with an alternative embodiment.

FIG. 3 is a block diagram depicting an architectural overview of a detailed system 100' for conducting a search using context information, in accordance with an alternative embodiment. Here, the networked system 100' includes a semantic support manager 110 that is in communication with one or more client computing devices 112, business applications 116, search engines 120, a user identity management system 308, and a human resources system 310. As discussed above, the semantic support manager 100' may be embodied in a variety of computing devices.

As depicted, this embodiment of the semantic support manager 110 includes a semantic context module 102, a message manager module 104, a text analyzer module 106, a contextual network module 108, and a semantic dispatcher module 114. The contextual network module 108 includes a user module 302, domain packages 304, and business functional data 306.

As an illustrative example, a user uses an application executed on the client computing device 112 to compose a message requesting, for example, technical support. The message manager module 104 receives the message from the client computing device 112. Upon receipt of the message, the semantic context module 102 identifies the user that initiated the message and retrieves context information associated with the user. In one embodiment, the semantic context module 102 can identify the user by communicating with the user identity management system 308. In particular, the user identity management system 308 manages users' access to applications. In particular, the user identity management system 308 provides a central mechanism for provisioning users in accordance with their current business roles, and it supports related processes such as password management, self-service, and approvals workflow. This user identity management system 308 can provide the semantic context module 102 with a user's identity.

With the user identified, the semantic context module 102, in accordance with an embodiment, can then request context information associated with the user from, for example, the human resource system 310. It should be noted that the human resource system 310 is designed to store and track employee or organizational data, such as personal histories, skills, capabilities, accomplishments, business roles, and salary. Many of such data stored in the human resource system 310 can be used as context information.

Still referring to FIG. 3, the contextual network module 108 retrieves the context information from the human resource system 310 and then identifies business functional data 306 (e.g., business objects 350-353) associated with the context information. As explained in more detail below, the business application 116, having user module 312 and business logic module 314, can be a source for the business functional data 306, which may be imported to the contextual network module 108 by way of semantic terminology importer 316.

Thereafter, the contextual network module 108 identifies one or more domains, which are defined by domain packages 304 as explained in detail below, associated with the business functional data 306. The user module 302 stores information about permissions to access business functional data 306. Such information in conjunction with the roles retrieved from the human resource system 310 can be used to identify business functional data that are accessible by a particular user. For example, the human resource system 310 identifies a user as a system administrator. The user module 302 includes a permission of a system administrator indicating that he has access all business objects 350-353. Accordingly, the contextual network module 108 can then identify that all business objects 350-353 are associated with the "system administrator" context information. In another example, the human resource system 310 can identify a user as a guest user. The user module 302 includes a permission of a guest user indicating that he has access to only business objects 350-351. Accordingly, the contextual network module 108 can identify that business objects 350-351 are associated with the "guest user" context information.

As discussed above, each identified business functional data 306 is assigned to one or more domains. The text analyzer module 106 selects one or more terms from the domains to include in a query. With the query constructed, the semantic dispatcher module 114 conducts a search of one or more data sources using the query. For example, in one embodiment, the semantic dispatcher module 114 can transmit the query to one or more search engines 120, which in turn use their own search algorithms to search for information or items that satisfy the query.

It should be appreciated that in other embodiments, the semantic support manager 110 may include fewer or more modules apart from those shown in FIG. 3. For example, in an alternate embodiment, the text analyzer module 106 can be integrated within the semantic context module 102. The modules 102, 104, 106, and 108 may be in the form of software that is processed by a processor. In another example, as explained in more detail below, the modules 102, 104, 106, and 108 may be in the form of firmware that is processed by application specific integrated circuits (ASIC), which may be integrated into a circuit board. Alternatively, the modules 102, 104, 106, and 108 may be in the form of one or more logic blocks included in a programmable logic device (for example, a field programmable gate array). The described modules 102, 104, 106, and 108 may be adapted, and/or additional structures may be provided, to provide alternative or additional functionalities beyond those specifically discussed in reference to FIG. 3. Examples of such alternative or additional functionalities will be discussed in reference to the flow diagrams discussed below.

Figure 4:
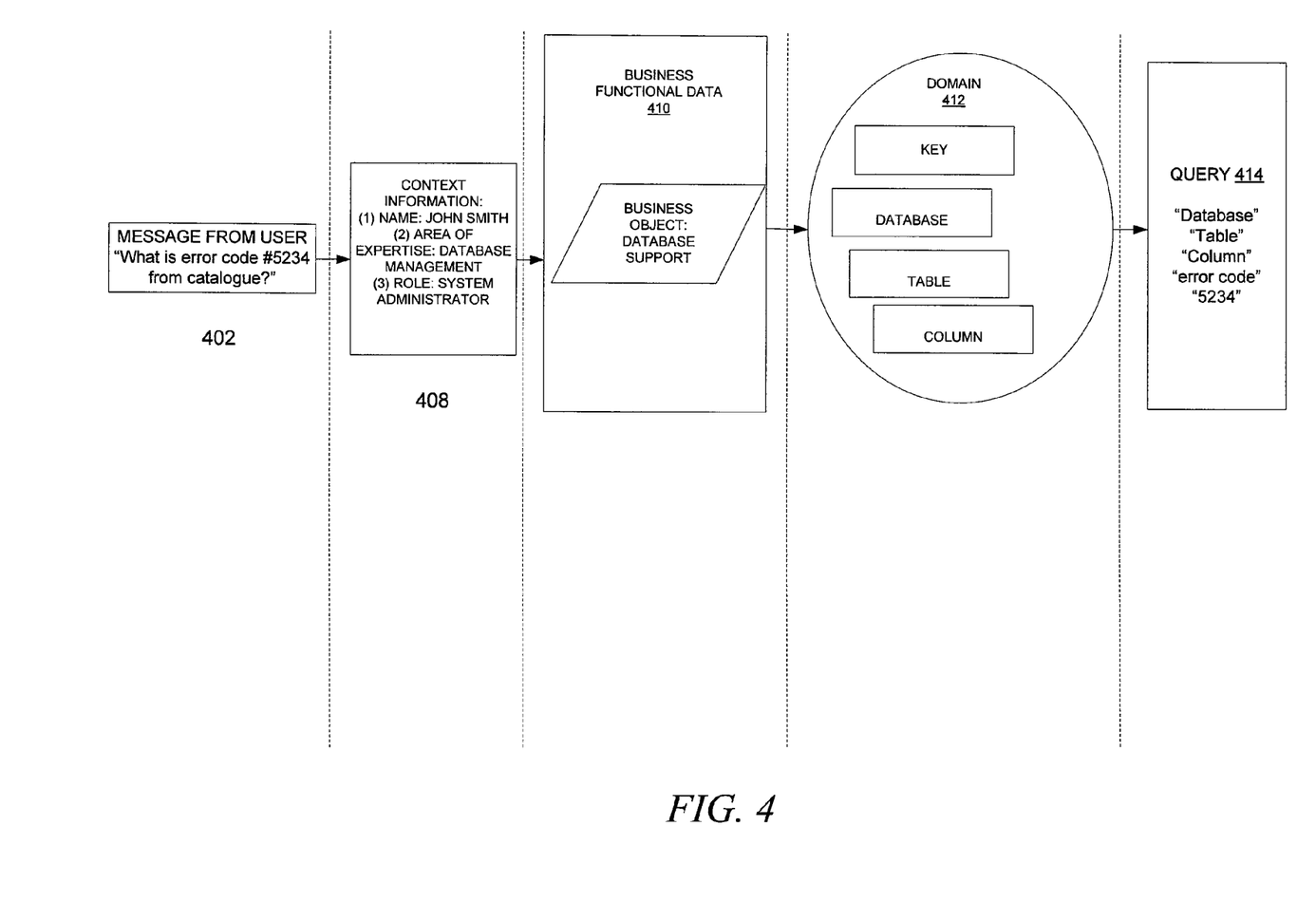
FIG. 4 is a diagram illustrating an example of the use of the semantic support manager to search of information related to technical support, in accordance with an example embodiment.

FIG. 4 is a diagram illustrating an example of the use of the semantic support manager to search of information related to technical support, in accordance with an example embodiment. In this example, a message manager module receives a message 402 from a user asking, "What is error code #5234 from catalogue?" Upon receipt of this message requesting technical support, the semantic context module queries a user identity management system for the identification of the user that initiated the message 402. The user identity management system identifies the user that transmitted the message 402 as "John Smith" and transmits the user's identity to the semantic context module. It should be noted that the user identity management system can use a variety of techniques to identify the user, such as examining the user's login or Internet Protocol address associated with the message.

With receipt of the user identified as "John Smith," the semantic context module queries a human resource system for additional context information 408 associated with the user "John Smith." As depicted, the additional context information 408 provided by the human resource system to the semantic context module include the user's area of expertise (database management) and the user's role (system administrator).

Figure 5:
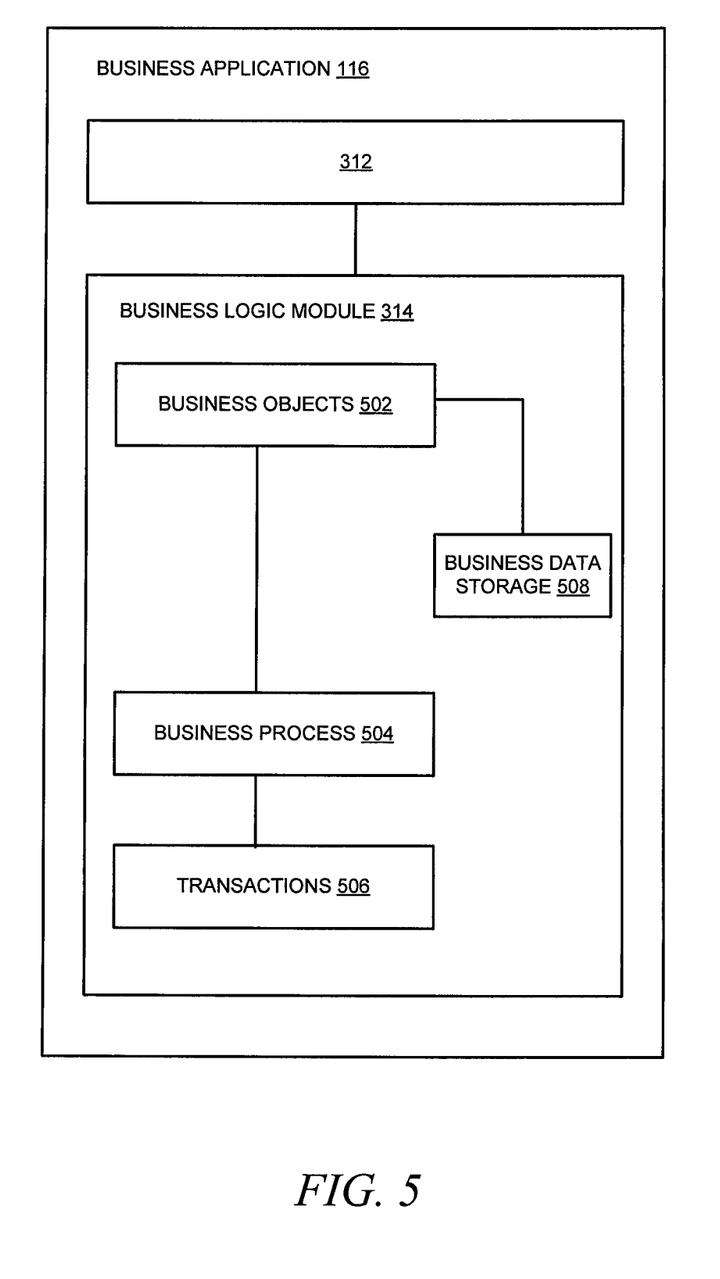
FIG. 5 is a block diagram depicting a business application as a source of business functional data, in accordance with an example embodiment.

With the user's role identified, the contextual network module then looks up the relationships stored in a user module to identify all business functional data 410 that are associated with the system administrator role. In this example, the "database support" business object is associated with the system administrator role. This "database support" business object and other business functional data can be imported from a business application. FIG. 5 is a block diagram depicting a business application 116 as a source of business functional data. In this example, the business application 116 includes a user module 312 and business logic module 314. The user module 312 stores information about permissions to access various business functional data stored in business logic module 314, the logic of which describes functional algorithms that prescribe how business functional data (e.g., business objects 502, business data storage 508, business process 504, and transactions 506) interact with one another. The business logic module 314 can be situated in a business layer of a Web application server architecture, and this business layer includes a run-time environment, which processes requests and dynamically generates responses.

Figure 6:
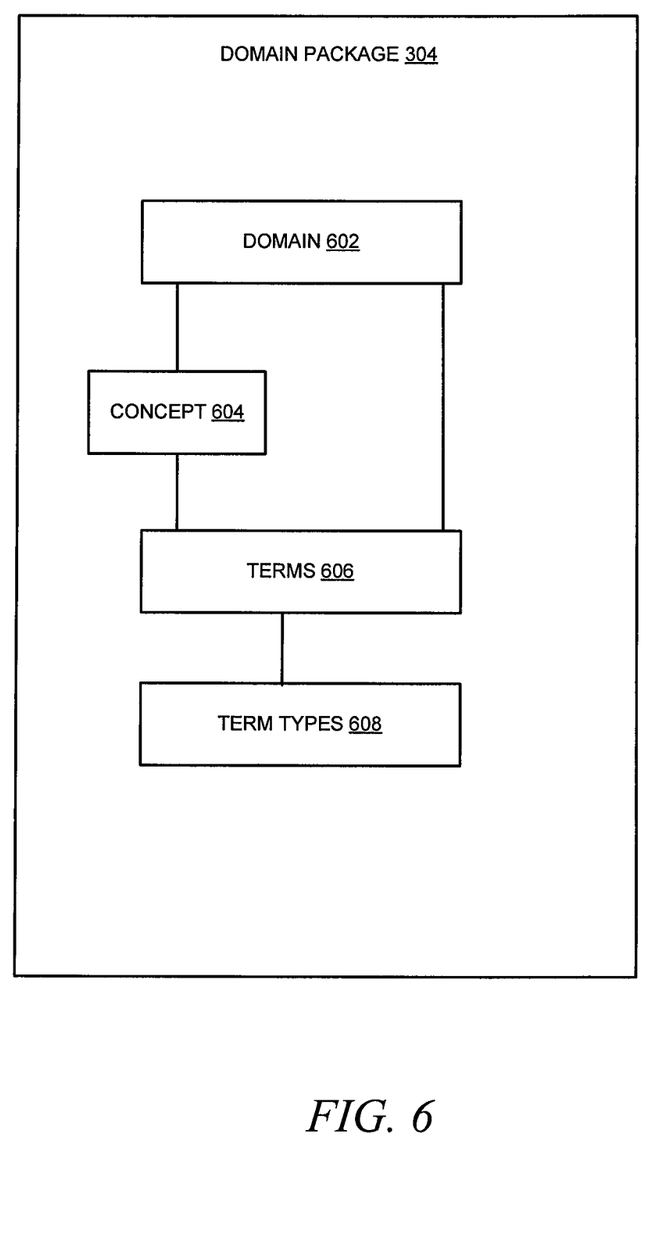
FIG. 6 is a block diagram depicting the detailed components of a domain package, in accordance with an example embodiment.

Returning to FIG. 4, the business functional data 410 identified to be associated with context information 408 includes "database support" business object. The contextual network module then identifies a domain 412 that is associated with the "database support" business object. As discussed above, the domain 412 is defined by a domain package stored in the contextual network module. FIG. 6 is a block diagram depicting the detailed components of a domain package 304, in accordance with an example embodiment. As depicted, a domain package 304 can include domain 602, concept 604, terms 606, and term types 608. The domain 602 defines a domain name. The concept 604 is a grouping of terms 606. For example, the terms 606 designate multiple customers, and the concept 604 can be a company that has been assigned to service these customers. The term types 608 are attributes of the terms 606.

Returning to FIG. 4, the domain 412 identified to be associated with the "database support" business object includes terminologies such as "database," "table," "key," and "column." The text analyzer module then selects one or more terms included in the domain 412 to include in a query. A variety of different selection techniques may be used. In one example embodiment, a text analyzer module can analyze the message 402 to make a selection based on finding synonyms between terms. For example, the original message 402 includes terms such as "error," "code," "#5234," and "catalogue." The text analyzer module, in one embodiment, can look for synonyms of the terms included in the message. For example, synonyms for the term "catalogue" can include "database," "table," and "column." As a result, the text analyzer module selects the terms "database," "table," and "column" to include in query 414. Additionally, the text analyzer module can include other terms from the original message 402, such as "error code" and "#5234" to include in the query 414. As a result, the semantic support manager constructs a query 414 having expanded terms "database," "error code," "#5234," "table," and "column" using the context information 408.

In one embodiment, the semantic dispatcher module then transmits the query 414 to one or more search engines to search for information that satisfy the query 414. For example, one type of search engine can be designed to search for contact information of one or more experts that provide the technical support. From such a search engine, the semantic support manager receives contact information of an expert that can provide the technical support, in accordance with an example embodiment. The semantic support manager then dispatches the expert to the user. As an example, the contact information may be the expert's telephone number, and the semantic support manager can directly connect the user to the expert by phone.

In an alternate embodiment, the semantic dispatcher module can transmit the query 414 to a different search engine that is designed to search for electronic documents. From this type of search engine, the semantic dispatcher module receives a listing of electronic documents that include information relevant to technical support. The semantic support manager can then forward the listing to the user that initiated the message 402.

Additionally, the contextual network may also contain previously-defined solutions, and in yet another embodiment, the semantic dispatcher module can call the contextual network for such solutions that satisfy the query. A business object definition is an example of such a pre-defined solution that is stored in the contextual network. Business object definitions are linked to their respective business objects and may be annotated or tagged with particular terms that can be searched.

As a result, the semantic support manager can use various context information associated with a user to expand and/or modify a query. A search using this expanded and/or modified query may result in a search that is more accurate and relevant when compared to, for example, a conventional search using a query that only uses terms from the original message. As such, in the technical support field, the semantic support manager can significantly reduce the costs to provide technical support and reduce support response time.

Figure 7:
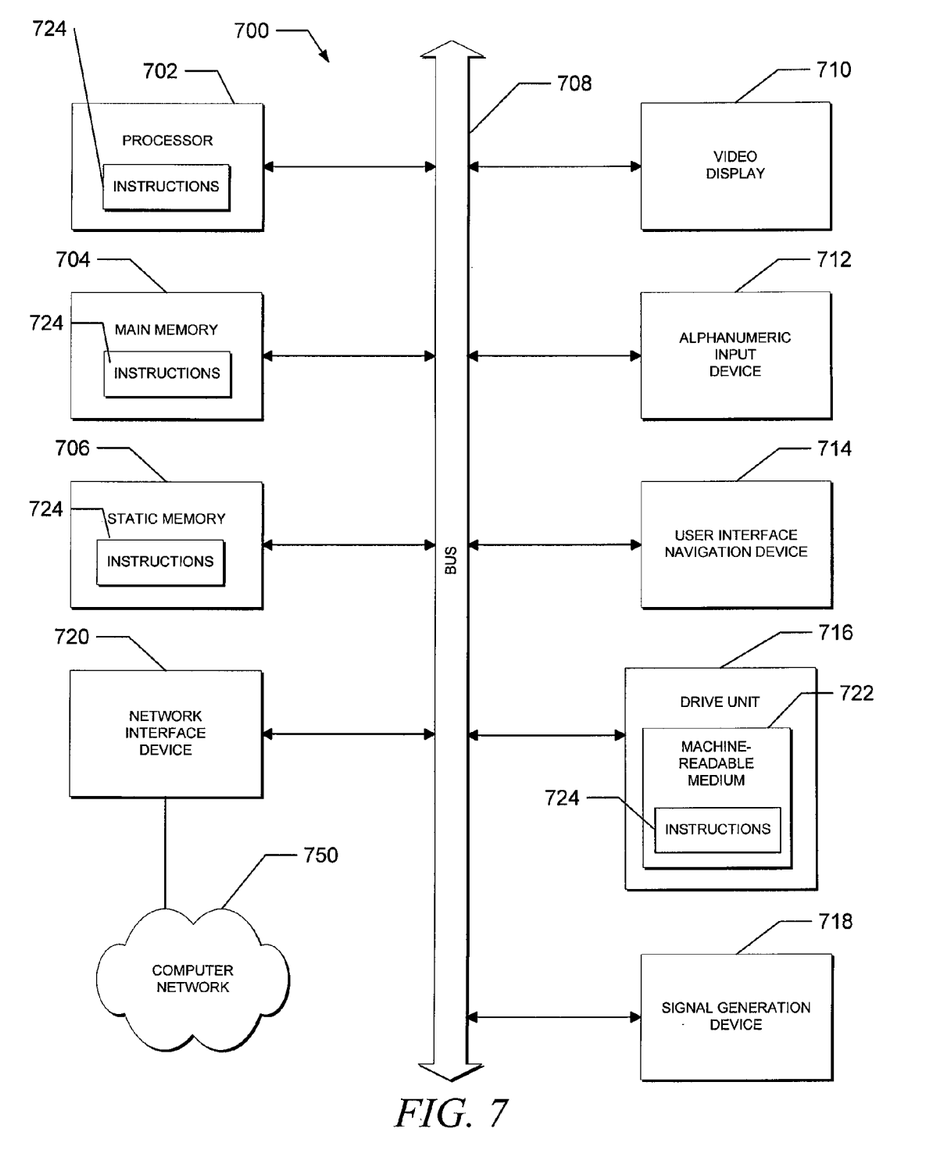
FIG. 7 depicts a block diagram of a machine in the example form of a computing device within which may be executed a set of instructions for causing the machine to perform any one or more of the methodologies discussed herein.

FIG. 7 depicts a block diagram of a machine in the example form of a computing device 700 within which may be executed a set of instructions for causing the machine to perform any one or more of the methodologies discussed herein. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment.

The machine is capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example of the computing device 700 includes a processor 702 (e.g., a central processing unit (CPU), a graphics processing unit (GPU) or both), a main memory 704 (e.g., random access memory), and static memory 706 (e.g., static random-access memory), which communicate with each other via bus 708. The computing device 700 may further include video display unit 710 (e.g., a plasma display, a liquid crystal display (LCD) or a cathode ray tube (CRT)). The computing device 700 also includes an alphanumeric input device 712 (e.g., a keyboard), a user interface (UI) navigation device 714 (e.g., a mouse), a disk drive unit 716, a signal generation device 718 (e.g., a speaker), and a network interface device 720.

The disk drive unit 716 (a type of non-volatile memory storage) includes a machine-readable medium 722 on which is stored one or more sets of data structures and instructions 724 (e.g., software) embodying or utilized by any one or more of the methodologies or functions described herein. The data structures and instructions 724 may also reside, completely or at least partially, within the main memory 704 and/or within the processor 702 during execution thereof by computing device 700, with the main memory 704 and processor 702 also constituting machine-readable, tangible media.

The data structures and instructions 724 may further be transmitted or received over a computer network 750 via network interface device 720 utilizing any one of a number of well-known transfer protocols (e.g., HyperText Transfer Protocol (HTTP)).

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., the computing device 700) or one or more hardware modules of a computer system (e.g., a processor 702 or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor 702 or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor 702 configured using software, the general-purpose processor 702 may be configured as respective different hardware modules at different times. Software may accordingly configure a processor 702, for example, to constitute a particular hardware module at one instance of time and to constitute a different hardware module at a different instance of time.

Modules can provide information to, and receive information from, other modules. For example, the described modules may be regarded as being communicatively coupled. Where multiples of such hardware modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

The various operations of example methods described herein may be performed, at least partially, by one or more processors 702 that are temporarily configured (e.g., by software) or permanently configured to perform the relevant operations. Whether temporarily or permanently configured, such processors 702 may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors 702 or processor-implemented modules. The performance of certain of the operations may be distributed among the one or more processors 702, not only residing within a single machine, but deployed across a number of machines. In some example embodiments, the processors 702 may be located in a single location (e.g., within a home environment, an office environment or as a server farm), while in other embodiments the processors 702 may be distributed across a number of locations.

While the embodiment(s) is (are) described with reference to various implementations and exploitations, it will be understood that these embodiments are illustrative and that the scope of the embodiment(s) is not limited to them. In general, techniques for data searches using context information may be implemented with facilities consistent with any hardware system or hardware systems defined herein. Many variations, modifications, additions, and improvements are possible.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the embodiment(s). In general, structures and functionality presented as separate components in the exemplary configurations may be implemented as a combined structure or component. Similarly, structures and functionality presented as a single component may be implemented as separate components. These and other variations, modifications, additions, and improvements fall within the scope of the embodiment(s).

What is claimed is:

1. A method of conducting a data search, the method comprising:
   receiving a message from a client application, the message comprising one or more user terms submitted by a user for conducting the data search;
   identifying the user that submitted the one or more user terms;
   retrieving context information using the identity of the user;
   identifying business functional data associated with the context information;
   identifying a domain package assigned to the business functional data, the assigned domain package including a number of domain terms, a defined domain name, a concept, and one or more term types;
   selecting a domain term, from the number of domain terms, to include in a query, the query being based on the user terms, the defined domain name, the concept, and the one or more term types; and
   conducting a search of a data source using the query, wherein the search is conducted by at least one hardware device.

2. The method of claim 1, wherein the message includes a different term, and wherein the selection of the term comprises searching, from the number of domain terms, for a synonym of the different term included in the message.

3. The method of claim 1, wherein the message is a request for technical support.

4. The method of claim 3, further comprising:
   in response to the search, receiving contact information of an expert that provides the technical support; and
   dispatching the user to the expert based on the contact information.

5. The method of claim 3, further comprising:
   in response to the search, receiving a listing of electronic documents that include information relevant to the technical support; and
   transmitting the listing to the user.

6. The method of claim 1, wherein the context information defines a role of the user.

7. The method of claim 6, wherein the business functional data is identified based on the role of the user.

8. The method of claim 1, wherein the conducting the search of the data source comprises transmitting the query to a search engine.

9. A non-transitory, machine-readable medium that stores instructions, which, when performed by a machine, cause the machine to perform operations comprising:
   receiving a message from a client application, the message comprising one or more user terms submitted by a user for conducting a data search;
   identifying the user that submitted the one or more user terms;
   retrieving context information using the identity of the user;
   identifying business functional data associated with the context information;
   identifying a domain package assigned to the business functional data, the assigned domain package including a number of domain terms, a defined domain name, a concept, and one or more term types;
   selecting a domain term, from the number of domain terms, to include in a query, the query being based on the user terms, the defined domain name, the concept, and the one or more term types; and
   conducting a search of a data source using the query.

10. The non-transitory, machine-readable medium of claim 9, wherein the message includes a different term, and wherein the operation of selecting the term comprises searching, from the number of domain terms, for a synonym of the different term included in the message.

11. The non-transitory, machine-readable medium of claim 9, wherein the message is a request for technical support, the operations further comprising:
   in response to the search, receiving contact information of an expert that provides the technical support; and
   dispatching the user to the expert based on the contact information.

12. The non-transitory, machine-readable medium of claim 9, wherein the message is a request for technical support, the operations further comprising:
   in response to the search, receiving a listing of electronic documents that include information relevant to the technical support; and
   transmitting the listing to the user.

13. The non-transitory, machine-readable medium of claim 9, wherein the context information defines a role of the user.

14. The non-transitory, machine-readable medium of claim 13, wherein the business functional data is identified based on the role of the user.

15. The non-transitory, machine-readable medium of claim 9, wherein the business functional data is a business object.

16. The non-transitory, machine-readable medium of claim 9, wherein the business functional data is a business process.

17. The non-transitory, machine-readable medium of claim 9, wherein the business functional data is a business data storage.

18. A computing device comprising:
   at least one processor; and
   a memory in communication with the at least one processor, the memory being configured to store a message manager module, a semantic context module, a contextual network module, a text analyzer module, and a semantic dispatcher module that are executable by the at least one processor;
      the message manager module having instructions that when executed by the at least one processor, cause message manager operations to be performed, the message manager operations comprising receiving a message from a client application, the message comprising one or more user terms submitted by a user for conducting a data search;
      the semantic context module having instructions that when executed by the at least one processor, cause semantic context operations to be performed, the semantic context operations comprising identifying the user that submitted the one or more user terms and retrieving context information using the identity of the user;
      the contextual network module having instructions that when executed by the at least one processor, cause contextual network operations to be performed, the contextual network operations comprising identifying business functional data associated with the context information and identifying a domain package assigned to the business functional data, the assigned domain package including a number of domain terms, a defined domain name, a concept, and one or more term types;
      the text analyzer module having instructions that when executed by the at least one processor, cause text analyzer operations to be performed, the text analyzer operations comprising selecting a domain term, from the number of domain terms, to include in a query, the query being based on the user terms, the defined domain name, the concept, and the one or more term types; and
      the semantic dispatcher module having instructions that when executed by the at least one processor, cause semantic dispatcher operations to be performed, the semantic dispatcher operations comprising conducting a search of a data source using the query.

19. The computing device of claim 18, wherein the message includes a different term, and wherein the operation of selecting the term comprises searching, from the number of domain terms, for a synonym of the different term included in the message.

20. The computing device of claim 18, wherein the business functional data is a business object.

* * * * *